United States Patent
Li

(10) Patent No.: US 10,267,974 B2
(45) Date of Patent: Apr. 23, 2019

(54) LIGHT GUIDE PLATE, BACKLIGHT AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 144 days.

(21) Appl. No.: 14/912,472

(22) PCT Filed: Jun. 12, 2015

(86) PCT No.: PCT/CN2015/081289
§ 371 (c)(1),
(2) Date: Feb. 17, 2016

(87) PCT Pub. No.: WO2016/107090
PCT Pub. Date: Jul. 7, 2016

(65) Prior Publication Data
US 2016/0349441 A1    Dec. 1, 2016

(30) Foreign Application Priority Data
Jan. 4, 2015   (CN) .................. 2015 2 0002394 U

(51) Int. Cl.
*F21V 8/00*   (2006.01)
(52) U.S. Cl.
CPC ......... *G02B 6/0043* (2013.01); *G02B 6/0016* (2013.01); *G02B 6/0061* (2013.01);
(Continued)

(58) Field of Classification Search
CPC .. G02B 6/0038; G02B 6/0053; G02B 6/0031; G02B 6/0036; G02B 6/0016;
(Continued)

(56) References Cited

U.S. PATENT DOCUMENTS 7,448,786 B2 * 11/2008 Yue ...................... G02B 6/0016
                                                        362/608
8,016,474 B2 *  9/2011 Ha ....................... G02B 6/0043
                                                        362/612
(Continued)

FOREIGN PATENT DOCUMENTS

CN        1417625 A      5/2003
CN        1967350 A      5/2007
(Continued)

OTHER PUBLICATIONS

International Search Report and Written Opinion dated Oct. 10, 2015; PCT/CN2015/051289.

*Primary Examiner* — Bryon T Gyllstrom
*Assistant Examiner* — James M Endo
(74) *Attorney, Agent, or Firm* — Ladas & Parry LP

(57) ABSTRACT

A light guide plate, a backlight and a display device are provided. The light guide plate includes a light incident surface, and a light emergent surface intersecting with the light incident surface, the light emergent surface being provided with a blank region close to the light incident surface; the blank region is provided with a plurality of convex point structures thereon. The light guide plate can reduce a disadvantageous effect of an adhesive preparation structure on the backlight and improve a light utilization rate of the backlight.

20 Claims, 4 Drawing Sheets

(52) U.S. Cl.
CPC .......... *G02B 6/0088* (2013.01); *G02B 6/0083* (2013.01); *G02B 6/0091* (2013.01)

(58) Field of Classification Search
CPC .. G02B 6/0028; G02B 6/0021; G02B 6/0068; G02B 6/0043; G02B 6/0061; G02B 6/0088; G02B 6/0091; G02B 6/0066; G02B 6/0081; G02B 6/0073; G02B 6/0015; G02B 6/0035
USPC .......................... 362/606, 608, 607, 610, 612
See application file for complete search history.

(56) References Cited

U.S. PATENT DOCUMENTS

| | | | | |
|---|---|---|---|---|
| 8,434,923 B2* | 5/2013 | Huang | ................ | G02B 6/0043 |
| | | | | 362/606 |
| 8,804,088 B2* | 8/2014 | Lee | ................... | G02B 6/0083 |
| | | | | 349/150 |
| 8,885,118 B2* | 11/2014 | Yuuki | ................... | G02B 6/002 |
| | | | | 349/65 |
| 9,435,936 B2* | 9/2016 | Chang | ................. | G02B 6/0036 |
| 9,442,240 B2* | 9/2016 | Chang | ................... | G02B 6/004 |
| 9,647,150 B2* | 5/2017 | Blasco Claret | ... | H01L 31/02327 |
| 2003/0086030 A1 | 5/2003 | Taniguchi et al. | | |
| 2007/0109464 A1 | 5/2007 | Jung et al. | | |
| 2008/0068858 A1 | 3/2008 | Yamamoto et al. | | |
| 2014/0063847 A1* | 3/2014 | Sakamoto | ........... | G02B 6/0031 |
| | | | | 362/609 |
| 2014/0355300 A1 | 12/2014 | Chang et al. | | |

FOREIGN PATENT DOCUMENTS

| | | |
|---|---|---|
| CN | 101149526 A | 3/2008 |
| CN | 203240400 U | 10/2013 |
| CN | 203615176 U | 5/2014 |
| CN | 204302525 U | 4/2015 |
| CN | 203745771 U | 7/2015 |

* cited by examiner

LIGHT GUIDE PLATE, BACKLIGHT AND DISPLAY DEVICE

TECHNICAL FIELD

Embodiments of the present disclosure relate to a light guide plate, a backlight and a display device.

BACKGROUND

Liquid crystal displays have been widely applied to a computer monitor, a laptop, a mobile phone, a liquid crystal television and other devices due to advantages such as small size, low power consumption, and low radiation. A backlight is a key component of the liquid crystal display; with development of science and technology, market requirements on backlight products are becoming increasingly high, and regardless of a vehicular product backlight or a backlight of a smart phone, high brightness, high grade, and high definition have already been general requirements in the market.

As shown in FIG. 1, a conventional backlight comprises a light guide plate 1' and a light source 2'; the light source 2' is provided on a Flexible Printed Circuit (FPC) 3', the light guide plate 1' includes a light incident surface 11', and a light emergent surface 13' intersecting with the light incident surface 11', as well as a bottom surface 12' opposite to the light emergent surface 13', and the Flexible Printed Circuit (FPC) 3' is adhered to a plastic frame 5' and a blank region of the light emergent surface 13' through an FPC adhesive preparation structure 4'. For example, the light source may use an organic Light-Emitting Diode (LED). In the above-described structure, since the FPC adhesive preparation structure 4' is closely adhered to the blank region of the light emergent surface 13' of the light guide plate 1, and the FPC adhesive preparation structure 4' has very small and densely distributed adhesive particles on a surface thereof, and in this case after the light guide plate is adhered, the total reflection condition of the blank region can be destroyed, so that part of light (e.g., light B in FIG. 1 and FIG. 2) is scattered before reaching a mesh point region of the light guide plate, resulting in loss of light and a reduced utilization rate of the backlight.

SUMMARY

Embodiments of the present disclosure provide a light guide plate, a backlight and a display device, which can reduce a disadvantageous effect of an adhesive preparation structure on the backlight, and improve a light utilization rate of the backlight.

An embodiment of the present disclosure provides a light guide plate, comprising a light incident surface, and a light emergent surface intersecting with the light incident surface, the light emergent surface being provided with a blank region close to the light incident surface, wherein the blank region is provided with a plurality of convex point structures thereon.

For example, the plurality of convex point structures is arranged uniformly.

For example, a ratio of a total area of the plurality of convex point structures in the blank region to an area of the blank region is 0.2 to 0.5.

For example, a cross-sectional shape of each of the convex point structures in a direction perpendicular to the light emergent surface is a semicircle, a rectangle or a trapezoid.

For example, a bottom surface of the convex point structure is a circle, and a diameter of the bottom surface of the convex point structure is 60 μm to 70 μm.

For example, heights of the plurality of convex point structures are all less than or equal to 0.05 mm.

For example, the light guide plate further comprises a mesh point region, the mesh point region being located on a bottom surface of the light guide plate, and the mesh point region being provided with a plurality of concave mesh point structures therein.

For example, shape sizes of the convex point structures in the blank region are greater than shape sizes of the mesh point structures in the mesh point region.

For example, a density of the convex point structure in the blank region is smaller than a density of the mesh point structure in the mesh point region.

An embodiment of the present disclosure further provides a backlight, comprising a flexible printed circuit board, a light source disposed on the flexible printed circuit board and the above-described light guide plate, wherein the flexible printed circuit board is adhered to the blank region through a first adhesive preparation structure, and the light source is located on a side of the light incident surface of the light guide plate.

An embodiment of the present disclosure further provides a display device, comprising the above-described backlight.

For example, the display device further comprises a plastic frame, and the flexible printed circuit board is adhered to the plastic frame of the display device through a second adhesive preparation structure.

For example, the first adhesive preparation structure and the second adhesive preparation structure are disposed around the light source to form an enclosure structure.

For example, the first adhesive preparation structure and the second adhesive preparation structure are formed integrally.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise specified, the technical terms or scientific terms here should be of general meanings as understood by those ordinarily skilled in the art. In the present disclosure, words such as "first", "second" and the like do not denote any order, quantity, or importance, but rather are used for distinguishing different components.

Figure 1:
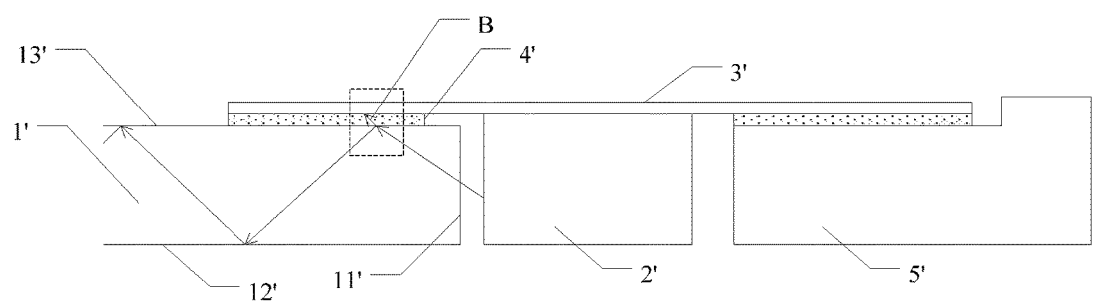
FIG. 1 is a schematic diagram of a backlight.
Figure 2:
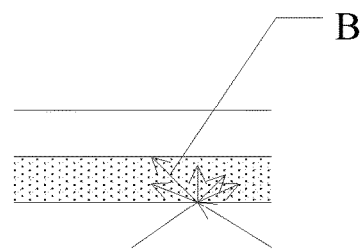
FIG. 2 is a schematic diagram of a dotted line region in FIG. 1.
Figure 3:
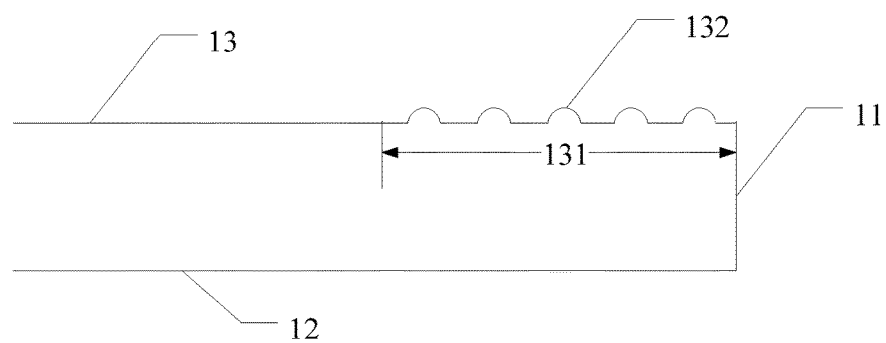
FIG. 3 is a schematic diagram of a light guide plate provided by an embodiment of the present disclosure.

FIG. 3 is a schematic diagram of a light guide plate provided by an embodiment of the present disclosure. The light guide plate comprises a light incident surface 11, and a light emergent surface 13 intersecting with the light incident surface 11, as well as a bottom surface 12 opposing the light emergent surface 13; the light emergent surface 13 is provided with a blank region 131 close to the light incident surface 11, and the blank region 131 is provided with a plurality of convex point structures 132 thereon.

It should be noted that, the light guide plate comprises a mesh point region and a blank region, and light guide mesh points are disposed within the mesh point region of the light guide plate. The blank region of the light guide plate is a region on the light guide plate not provided with the light guide mesh points. The region on the light guide plate outside the mesh point region is the blank region.

For example, in the embodiment of the present disclosure, a cross-sectional shape of each convex point structure 132 in a direction perpendicular to the light emergent surface 13 of the light guide plate may be a semicircle, a rectangle or a trapezoid, a bottom surface thereof may be a circle, and a diameter thereof may be 60 μm to 70 μm, which may be, for example, 63 μm, 65 μm, 68 μm, etc., and a size thereof may be set according to a size of the light guide plate. A height of each convex point structure 132 may be less than or equal to 0.05 mm, which may be, for example, 0.02 mm or 0.03 mm.

In the embodiment of the present disclosure, the blank region 131 on the light guide plate is used for adhering the Flexible Printed Circuit (FPC) through a first adhesive preparation structure, and by providing a plurality of convex point structures in the blank region, tops of the plurality of convex point structures in the blank region are in contact with the first adhesive preparation structure, and the remaining region in the blank region is not in contact with the first adhesive preparation structure, that is, the contact mode between the blank region and the first adhesive preparation structure is changed from surface contact to point contact, so that the contact area between the first adhesive preparation and the blank region can be reduced, and the region in the blank region not in contact with the first adhesive preparation structure can still maintain its own original total reflection property, to reduce light scattered in the blank region, so as to reduce the disadvantageous effect of the first adhesive preparation on the backlight, and improve a light utilization rate of the backlight.

For example, the plurality of convex point structures may be provided in the blank region on the light guide plate, and the plurality of convex point structures are arranged uniformly, so as to improve uniformity of light which is reflected through the blank region to the mesh point region of the light guide plate as far as possible. With such a setting, a better adhering effect between the Flexible Printed Circuit (FPC) and the blank region can also be obtained.

Figure 4:
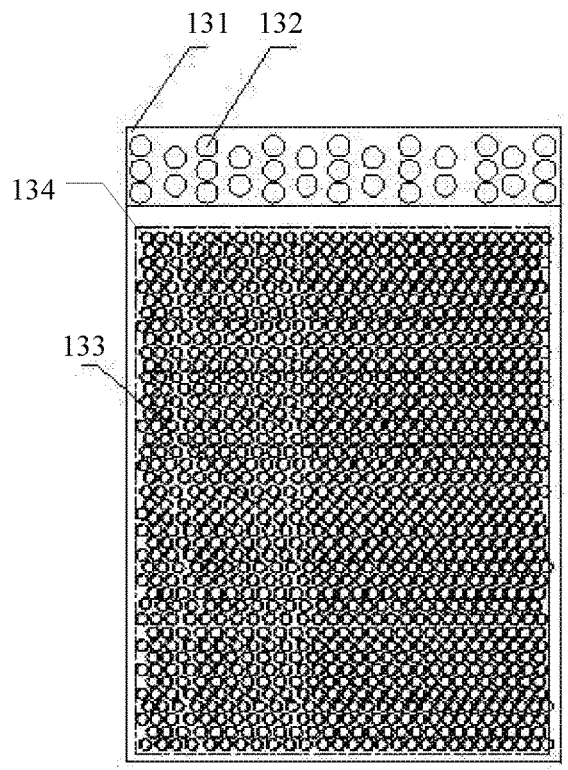
FIG. 4 is a schematic diagram of another light guide plate provided by an embodiment of the present disclosure.

With reference to FIG. 4, FIG. 4 is a schematic diagram of another light guide plate provided by an embodiment of the present disclosure. The light guide plate comprises a light incident surface, and a light emergent surface intersecting with the light incident surface, as well as a bottom surface opposing the light emergent surface; the light emergent surface is provided with a blank region 131 close to the light incident surface, the blank region 131 is provided with a plurality of convex point structures 132 arranged uniformly, the mesh point region (located on the bottom surface of the light guide plate) 133 of the light guide plate is provided with a plurality of concave mesh point structures 134 therein, a shape size of the convex point structure 132 in the blank region is greater than a shape size of the mesh point structure 134 in the mesh point region, and a sparse degree (which may be represented by "density", i.e., the number of the convex point structures within a unit area) of the convex point structures 132 in the blank region is smaller than a sparse degree (density) of the mesh point structures 134 in the mesh point region. For example, a ratio of a total area of the plurality of convex point structures as described above in the blank region to an area of the blank region may be 0.2 to 0.5, for example, may be 0.3, 0.4 and so on.

For example, in the light guide plate provided by the embodiment of the present disclosure, the mesh point structure of the mesh point region (V/A region) is in a concave shape, the mesh point structures have a small shape and are distributed densely, which may be almost invisible to a naked eye; the convex point structures in the blank region have a large shape and are distributed sparsely, which are visible to the naked eye; and when light generated by the light source enters the light guide plate through the light incident surface of the light guide plate, it is firstly reflected by the blank region into the mesh point region, and then is emitted out through the light emergent surface.

An embodiment of the present disclosure further provides a backlight, comprising a flexible printed circuit board, a light source disposed on the flexible printed circuit board and the light guide plate according to any one of the above-described embodiments; the flexible printed circuit board is adhered to a blank region of a light emergent surface of the light guide plate through a second adhesive preparation structure, and the light source is located on a side of a light incident surface of the light guide plate.

Figure 5:
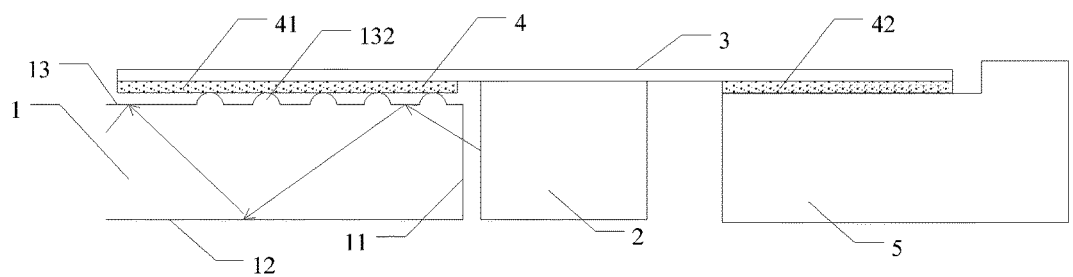
FIG. 5 is a schematic diagram of a display device provided by an embodiment of the present disclosure.

With reference to FIG. 5, FIG. 5 is a schematic diagram of a display device provided by an embodiment of the present disclosure, and the display device comprises a backlight, the backlight including a flexible printed circuit board 3, a light source 2 disposed on the flexible printed circuit board 3, and a light guide plate 1; the light guide plate includes a light incident surface 11, and a light emergent surface 13 intersecting with the light incident surface 11, as well as a bottom surface 12 opposing the light emergent surface 13; the light emergent surface 13 is provided with a blank region close to the light incident surface 11, the blank region is provided with a convex point structure 132 thereon, the flexible printed circuit board 3 is adhered to the blank region of the light emergent surface 13 of the light guide plate through a first adhesive preparation structure 41, and the flexible printed circuit board 3 is adhered to a plastic frame 5 of the display device through a second adhesive preparation structure 42. In a case where the first adhesive preparation structure and the second adhesive preparation structure are formed integrally, the flexible printed circuit board 3 is adhered to the blank region of the light emergent surface 13 of the light guide plate through a first portion of the adhesive preparation structure 4, and the flexible printed circuit board 3 is further adhered to the plastic frame 5 of the display device through a second portion of the adhesive preparation structure 4.

Figure 6:
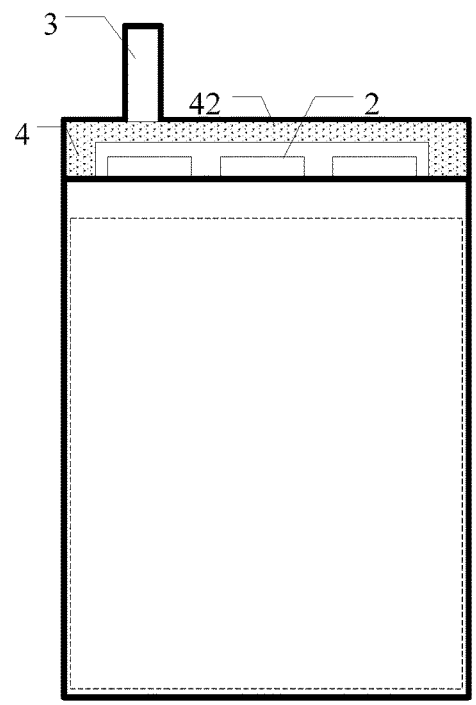
FIG. 6 is a schematic diagram of a light emergent surface of a light guide plate in the display device provided by the embodiment of the present disclosure.
Figure 7:
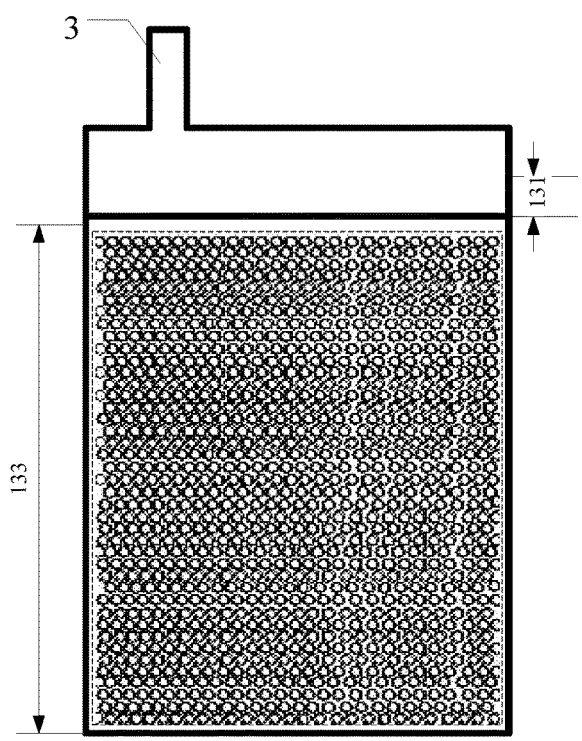
FIG. 7 is a schematic diagram of a bottom surface of the light guide plate in the display device provided by the embodiment of the present disclosure.

With reference to FIG. 6 and FIG. 7, FIG. 6 is a schematic diagram of a light emergent surface of a light guide plate in the display device. FIG. 7 is a schematic diagram of a bottom surface of the light guide plate. The flexible printed circuit board 3 is adhered to the blank region 131 of the light emergent surface of the light guide plate through the first adhesive preparation structure 41 or a first portion of the adhesive preparation structure 4, and the light source 2 is located on a side of the light incident surface of the light guide plate 1, light emitted thereby enters the light guide plate through the light incident surface of the light guide plate, and thereafter is reflected by the blank region 131 into the mesh point region 133, and then is emitted out through the light emergent surface. Since the blank region of the light emergent surface of the light guide plate is provided with a plurality of convex point structures thereon, a contact area between the adhesive preparation structure and the blank region is reduced, so as to reduce light scattered in the blank region, and improve a light utilization rate of the backlight.

Figure 8:
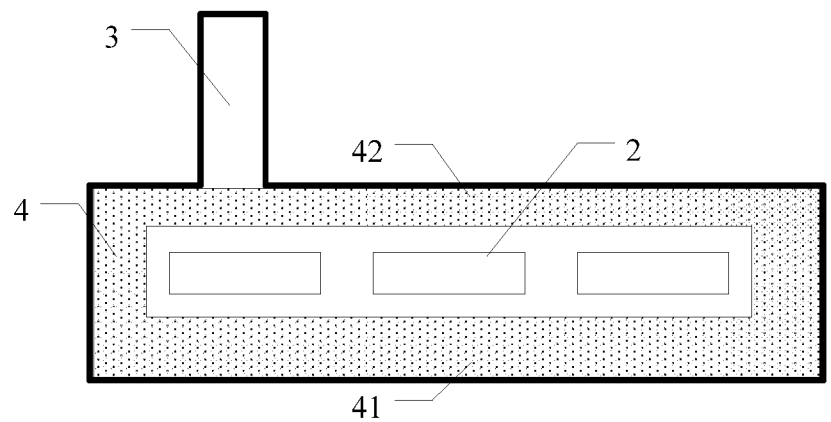
FIG. 8 is a schematic diagram of an adhesive preparation structure provided by an embodiment of the present disclosure.
Figure 9:
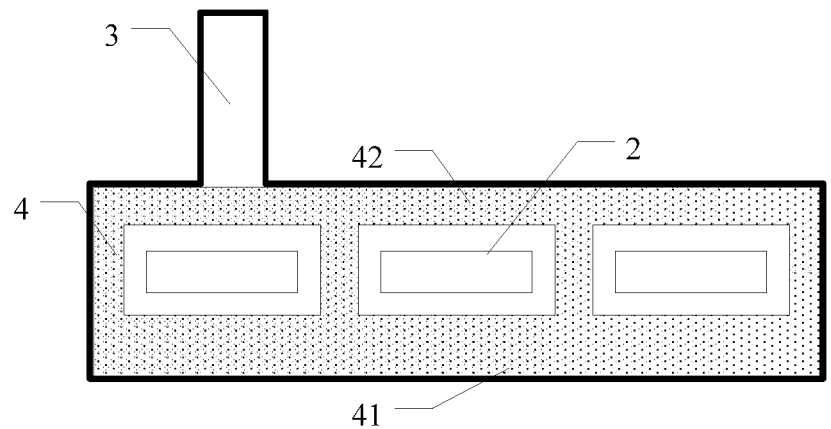
FIG. 9 is a schematic diagram of another adhesive preparation structure provided by an embodiment of the present disclosure.

For example, in order to avoid an FPC floating phenomenon resulted from unsound adherence of the FPC due to the above-described convex point structure, the adhesive preparation structure may be disposed around the light source to form an enclosure structure, which may be as shown in FIG. 8 and FIG. 9. In FIG. 8, the adhesive preparation structure 4 as a whole is in a "dual rectangular" (concentric rectangle) shape, and all the light sources are disposed in a middle position of the adhesive preparation structure. In FIG. 9, the adhesive preparation structure 4 is shown as a plurality of structures of the "dual rectangular" shape, and each structure of the "dual rectangular" shape surrounds one light source 2.

It should be noted that the plurality of convex point structures disposed in the blank region may also be changed to a plurality of concave point structures disposed in the blank region, so that the contact area between the first adhesive preparation and the blank region can be reduced, and the region in the blank region not in contact with the first adhesive preparation structure can still maintain its own original total reflection property, to reduce light scattered in the blank region so as to reduce the disadvantageous effect of the first adhesive preparation on the backlight, and improve a light utilization rate of the backlight. Correspondingly, the parts of "convex point structure" in the above description can all be changed into the "concave point structure". If the blank region is provided with the plurality of concave point structures, in the blank region the first adhesive preparation structure is in contact with a non-concave point structure, and a concave point structure region is not in contact with the first adhesive preparation structure. That is, the structure formed by vertically overturning the convex point structure in FIG. 5 is just the concave point structure.

In the display device provided by the embodiment of the present disclosure, by providing the convex point structure in the blank region of the light guide plate, the contact area between the adhesive preparation and the blank region can be reduced, so that a region in the blank region not in contact with the adhesive preparation structure can still maintain its own original total reflection property, so as to reduce a disadvantageous effect of the adhesive preparation on the backlight, and improve the light utilization rate of the backlight. In addition, the adhesive preparation structure is set as a shape surrounding the light source, which can effectively avoid the FPC floating phenomenon resulted from an insufficient adherence area of the FPC, that is, a phenomenon of uneven brightness of light emitted by the light source (i.e., a hotspot firefly phenomenon, a high-brightness region and a low-brightness region alternate, so that a plurality of points including alternately arranged dark and bright ones appear on a display panel) as well as a beam problem.

The foregoing is only specific embodiments of the present disclosure, but the protection scope of the present disclosure is not limited thereto. In the technical scope disclosed by the present disclosure, changes or substitutions easily thought by any skilled in the art are all covered in the protection scope of the present disclosure. Therefore, the protection scope of the present disclosure should be the protection scope of the claims.

The application claims priority of Chinese Patent Application No. 201520002394.4 filed on Jan. 4, 2015, the disclosure of which is incorporated herein by reference in its entirety as part of the present application.

The invention claimed is:

1. A backlight, comprising a flexible printed circuit board, a light source disposed on the flexible printed circuit board and a light guide plate, the light guide plate comprising a light incident surface, and a light emergent surface intersecting with the light incident surface, the light emergent surface being provided with a blank region close to the light incident surface,
   wherein the blank region is provided with a plurality of convex point structures thereon;
   wherein the flexible printed circuit board is adhered to the plurality of convex point structures in the blank region through a first adhesive preparation structure;
   where a gap is provided between the first adhesive preparation structure and a part of the blank region;
   wherein the part of the blank region is between adjacent convex point structures and opposite to the first adhesive preparation structure; and
   wherein only tops of the plurality of convex point structures in the blank region are in contact with the first adhesive preparation structure to form point contact between the blank region and the first adhesive preparation structure.

2. The backlight according to claim 1, wherein the plurality of convex point structures are arranged uniformly.

3. The backlight according to claim 2, wherein a ratio of a total area of the plurality of convex point structures in the blank region to an area of the blank region is 0.2 to 0.5.

4. The backlight according to claim 1, wherein a cross-sectional shape of each of the convex point structures in a direction perpendicular to the light emergent surface is a semicircle, a rectangle or a trapezoid.

5. The backlight according to claim 1, wherein in a sectional view of the backlight, each of the plurality of convex point structures has an arc shape.

6. The backlight according to claim 5, wherein a diameter of the bottom surface of each of the convex point structures is 60 μm to 70 μm.

7. The backlight according to claim 1, wherein heights of the plurality of convex point structures are all less than or equal to 0.05 mm.

8. The backlight according to claim 1, further comprising a mesh point region, the mesh point region being located on a bottom surface of the light guide plate, and the mesh point region being provided with a plurality of concave mesh point structures therein.

9. The backlight according to claim 8, wherein shape sizes of the convex point structures in the blank region is greater than shape sizes of the mesh point structures in the mesh point region.

10. The backlight according to claim 9, wherein a density of the convex point structures in the blank region is smaller than a density of the mesh point structures in the mesh point region.

11. The backlight according to claim 8, wherein the plurality of convex point structures are arranged uniformly.

12. The backlight according to claim 8, wherein a cross-sectional shape of each of the convex point structures in a direction perpendicular to the light emergent surface is a semicircle, a rectangle or a trapezoid.

13. The backlight according to claim 8, wherein in a sectional view of the backlight, each of the plurality of convex point structures has an arc shape.

14. The backlight according to claim 13, wherein a diameter of the bottom surface of each of the convex point structures is 60 μm to 70 μm.

15. The backlight according to claim 1, wherein the light source is located on a side of the light incident surface of the light guide plate.

16. The backlight according to claim 1, wherein a remaining region other than the tops of the plurality of convex point structures in the blank region is not in contact with the first adhesive preparation structure.

17. A display device, comprising the backlight according to claim 15.

18. The display device according to claim 17, further comprising a plastic frame, wherein the flexible printed circuit board is adhered to the plastic frame of the display device through a second adhesive preparation structure.

19. The display device according to claim 18, wherein the first adhesive preparation structure and the second adhesive preparation structure are disposed around the light source to form an enclosure structure.

20. The display device according to claim 19, wherein the first adhesive preparation structure and the second adhesive preparation structure are formed integrally.

* * * * *